(12) United States Patent
Matsumoto

(10) Patent No.: US 11,056,941 B2
(45) Date of Patent: Jul. 6, 2021

(54) ROTOR OF ROTARY ELECTRIC MACHINE AND METHOD FOR COOLING ROTARY ELECTRIC MACHINE

(71) Applicant: TOYOTA JIDOSHA KABUSHIKI KAISHA, Toyota (JP)

(72) Inventor: Takashi Matsumoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 466 days.

(21) Appl. No.: 16/050,204

(22) Filed: Jul. 31, 2018

(65) Prior Publication Data

US 2019/0074742 A1  Mar. 7, 2019

(30) Foreign Application Priority Data

Sep. 4, 2017 (JP) .............................. JP2017-169288

(51) Int. Cl.
*H02K 1/32* (2006.01)
*H02K 1/27* (2006.01)
*H02K 9/19* (2006.01)

(52) U.S. Cl.
CPC ............... *H02K 1/32* (2013.01); *H02K 1/276* (2013.01); *H02K 9/19* (2013.01)

(58) Field of Classification Search
CPC ............ H02K 1/32; H02K 1/276; H02K 9/19; H02K 9/26
See application file for complete search history.

(56) References Cited

U.S. PATENT DOCUMENTS

| | | | | |
|---|---|---|---|---|
| 6,727,609 B2* | 4/2004 | Johnsen | .................... | H02K 1/32 310/52 |
| 2014/0265657 A1* | 9/2014 | Raczek | .................... | H02K 9/19 310/54 |
| 2015/0381015 A1* | 12/2015 | Hattori | ..................... | H02K 9/19 310/59 |
| 2016/0036276 A1 | 2/2016 | Yamagishi et al. | | |
| 2016/0233744 A1* | 8/2016 | Kaneshige | ............... | H02K 9/19 |
| 2016/0372983 A1* | 12/2016 | Okochi | .................... | H02K 1/32 |
| 2017/0012503 A1* | 1/2017 | Okochi | .................... | H02K 1/32 |
| 2018/0205294 A1* | 7/2018 | Manabe | ................... | H02K 9/19 |

FOREIGN PATENT DOCUMENTS

| | | |
|---|---|---|
| CN | 206237253 U | 6/2017 |
| JP | 2007-174755 A | 7/2007 |
| JP | 2012-065500 A | 3/2012 |
| JP | 2014-176235 A | 9/2014 |
| JP | 2017-093255 A | 5/2017 |

* cited by examiner

*Primary Examiner* — Emily P Pham
(74) *Attorney, Agent, or Firm* — Oliff PLC

(57) ABSTRACT

A rotor of the rotary electric machine includes a rotor core, and a plurality of permanent magnets disposed in an inner part or an outer circumferential surface of the rotor core in a circumferential direction. In the rotor core, one or more first flow passages through which a cooling liquid flows, the one or more first flow passages extending in an axial direction and communicating with the outside of the rotor, and one or more second flow passages extending radially outward from the first flow passage and having closed distal ends, are formed.

6 Claims, 6 Drawing Sheets

ROTOR OF ROTARY ELECTRIC MACHINE AND METHOD FOR COOLING ROTARY ELECTRIC MACHINE

CROSS REFERENCE TO RELATED APPLICATION

The entire disclosure of Japanese Patent Application No. 2017-169288 filed on Sep. 4, 2017, including the specification, claims, drawings, and abstract is incorporated herein by reference in its entirety.

TECHNICAL FIELD

The present invention relates to a rotor of a rotary electric machine, particularly, a cooling structure thereof, and a method for cooling the rotary electric machine.

BACKGROUND

As is well known, the rotary electric machine generates heat with driving thereof and the temperature rises. In order to cool such a rotary electric machine, from related art, it has been proposed to cool each part of the rotary electric machine by making a cooling liquid flow through each part. For example, in JP 2014-176235 A, it is proposed to provide a flow passage extending in an axial direction in a rotor core and make the cooling liquid flow through the flow passage. The cooling liquid supplied to the flow passage is discharged to the outside from both end faces in the axial direction of the rotor core. When the cooling liquid discharged from the end face in the axial direction of the rotor core is scattered toward a stator located on an outer circumferential side by the centrifugal force, the stator is also cooled.

Here, in general, the cooling liquid used for such cooling is often used repeatedly, while circulating through a predetermined path. For example, the cooling liquid ejected from the rotor core and hitting on the stator is recovered and cooled, and then is supplied to the rotor core again via a rotary shaft or the like. Therefore, when the cooling liquid continues to be used for a long period of time, foreign matter abraded and released from a member located in a circulation path may be mixed. In particular, when the cooling liquid is made to flow not only to the rotary electric machine but also to the periphery of mechanical components such as gears, the metal powder abraded and released by engagement between the mechanical components such as gears may be mixed into the cooling liquid.

In the case of using the cooling liquid mixed with such foreign matter, an object to be cooled and the foreign matter collide with each other, which may cause damage to the object to be cooled. In particular, when the foreign matter is mixed into the cooling liquid ejected from a rotor core to a stator coil, deterioration of an enamel coating of the stator coil or the like is caused. Further, when a large amount of foreign matter is mixed into the cooling liquid, there is also a risk of clogging of the flow passage through which the cooling liquid flows.

Therefore, in the present specification, a rotor core capable of reducing foreign matter contained in the cooling liquid, and a method for cooling the rotary electric machine are disclosed.

SUMMARY

A rotor of a rotary electric machine disclosed in the present specification is a rotor of a rotary electric machine including a rotor core, and a plurality of permanent magnets disposed in an inner part or an outer circumferential surface of the rotor core in a circumferential direction. In the rotor core, one or more first flow passages through which a cooling liquid flows, the one or more first flow passages extending in an axial direction and communicating with the outside of the rotor, and one or more second flow passages extending radially outward from the first flow passage and having closed distal ends, are formed.

With such a configuration, the foreign matter contained in the cooling liquid flowing through the first flow passage flows into the second flow passage by the centrifugal force generated with rotation of the rotor and remains in the second passage. As a result, it is possible to reduce foreign matter contained in the cooling liquid flowing through the first flow passage.

The first flow passage may be formed on a radially more inward side than the permanent magnet, and a distal end of the second flow passage may be located at a position where the permanent magnet is able to magnetically attract the foreign matter including a magnetic material reaching the distal end of the second flow passage.

With such a configuration, since the foreign matter including the magnetic material receives the magnetic force of the permanent magnet in addition to the centrifugal force, the foreign matter more reliably flows into the second flow passage and remains. As a result, it is possible to more reliably reduce the foreign matter contained in the cooling liquid flowing through the first flow passage. Further, even after the rotation of the rotor is stopped, it is possible to prevent the foreign matter including the magnetic material from returning to the first flow passage.

Further, the first flow passage may have an inlet port of the cooling liquid, and at least one of the second flow passages may extend from the same axial position as the inlet port of the first flow passage.

By providing the second flow passage at the same axial position as the inlet port of the cooling liquid, that is, the upstream end of flow of the cooling liquid, the foreign matter can be caught at the upstream end of the flow of the cooling liquid and the foreign matter flowing downstream can be reduced.

In addition, the rotor core may be a laminate in which a plurality of steel plates is laminated in the axial direction, and the longitudinal direction of the first flow passage may be parallel to the axial direction.

With such a configuration, it is possible to reduce the number of types of steel plates constituting the rotor core.

In addition, a plurality of second flow passages may be connected to each of the first flow passages at intervals in the axial direction.

By providing a plurality of second flow passages, it is possible to more reliably catch foreign matter mixed into the cooling liquid before the cooling liquid is ejected from the rotor core. As a result, it is possible to effectively prevent damage to the stator due to foreign matter contained in the cooling liquid.

A method for cooling a rotary electric machine disclosed in this specification is a method for cooling a rotary electric machine including a rotor, a stator arranged concentrically with the rotor, and a rotary shaft fixed to a center of the rotor and rotating together with the rotor. The rotor has a rotor core, and a plurality of permanent magnets arranged in an inner part or an outer circumferential surface of the rotor core in a circumferential direction. In the rotor core, there are formed one or more first flow passages through which a cooling liquid flows and which extend in an axial direction and communicate with the outside of the rotor, and one or more second flow passages extending radially outward from the first flow passage and having closed distal ends. The rotary electric machine is cooled by supplying the cooling liquid, which has a specific gravity smaller than foreign matter expected to be mixed into the cooling liquid, to the first flow passage.

By making a cooling liquid having a smaller specific gravity than foreign matter that is expected to flow, the foreign matter having a heavier specific gravity than the cooling liquid flows into the second flow passage by centrifugal separation action and remains. As a result, foreign matter contained in the cooling liquid flowing through the first flow passage can be reduced.

According to the rotor core and the method for cooling the rotary electric machine disclosed in this specification, the foreign matter contained in the cooling liquid flowing through the first flow passage flows into the second flow passage by the centrifugal force generated with rotation of the rotor and remains. As a result, it is possible to reduce foreign matter contained in the cooling liquid flowing through the first flow passage.

BRIEF DESCRIPTION OF DRAWINGS

Embodiment(s) of the present disclosure will be described based on the following figures, wherein.

DESCRIPTION OF EMBODIMENTS

Figure 1:
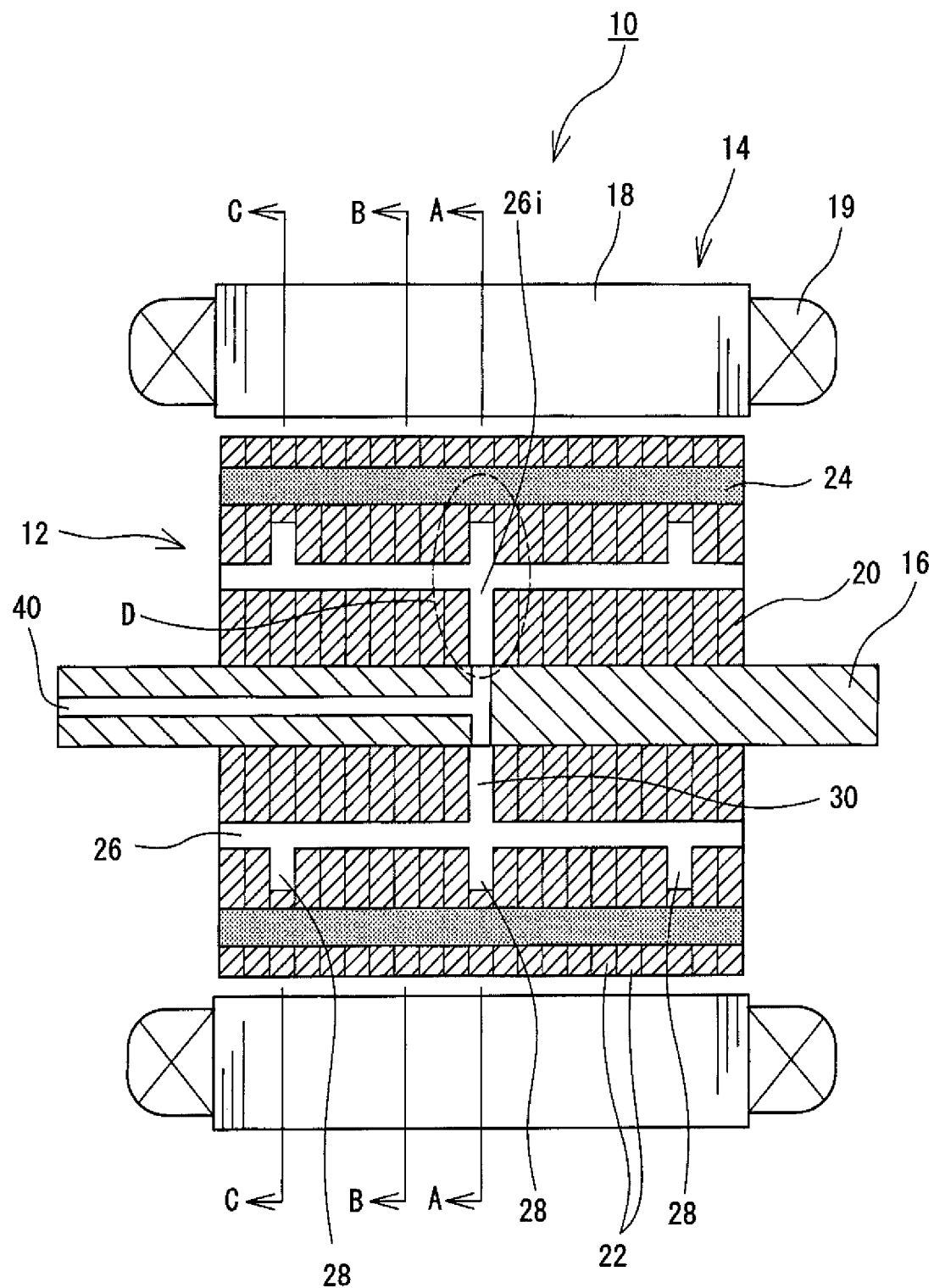
FIG. 1 is a schematic longitudinal sectional view of a rotary electric machine.
Figure 2A:
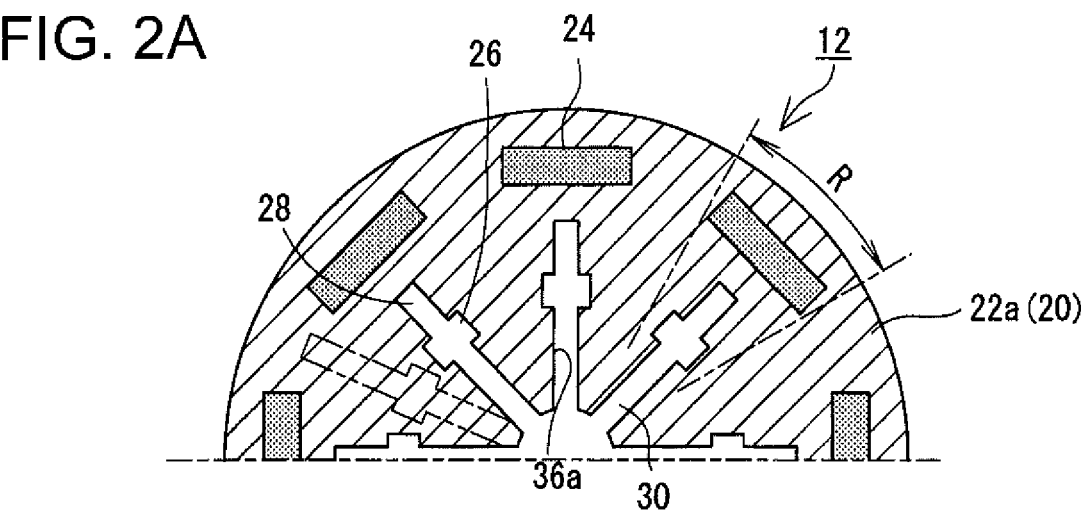
FIG. 2A is a cross-sectional view of a rotor taken along a line A-A of FIG. 1.
Figure 2B:
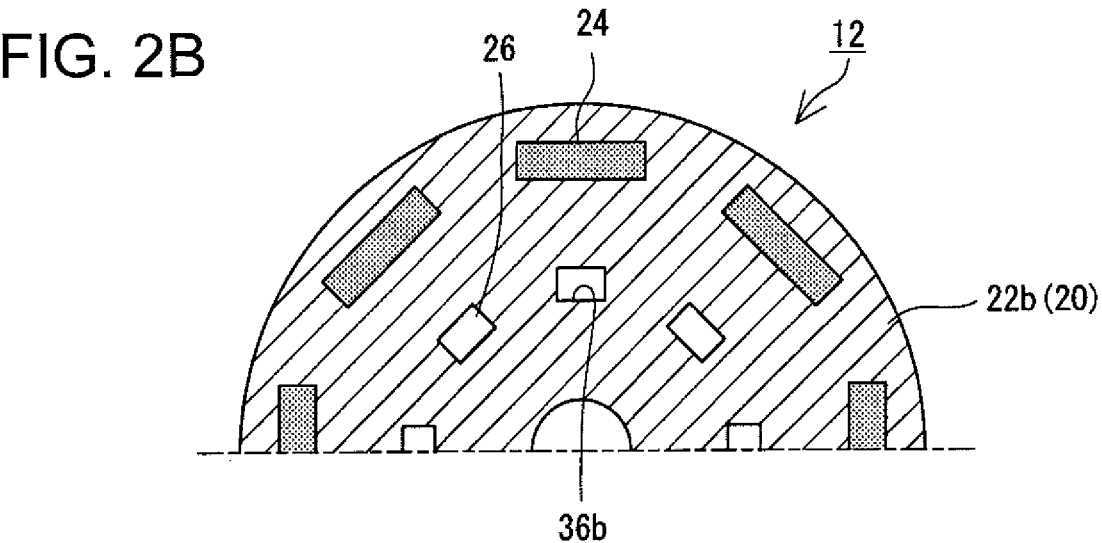
FIG. 2B is a cross-sectional view of the rotor taken along a line B-B of FIG. 1.
Figure 2C:
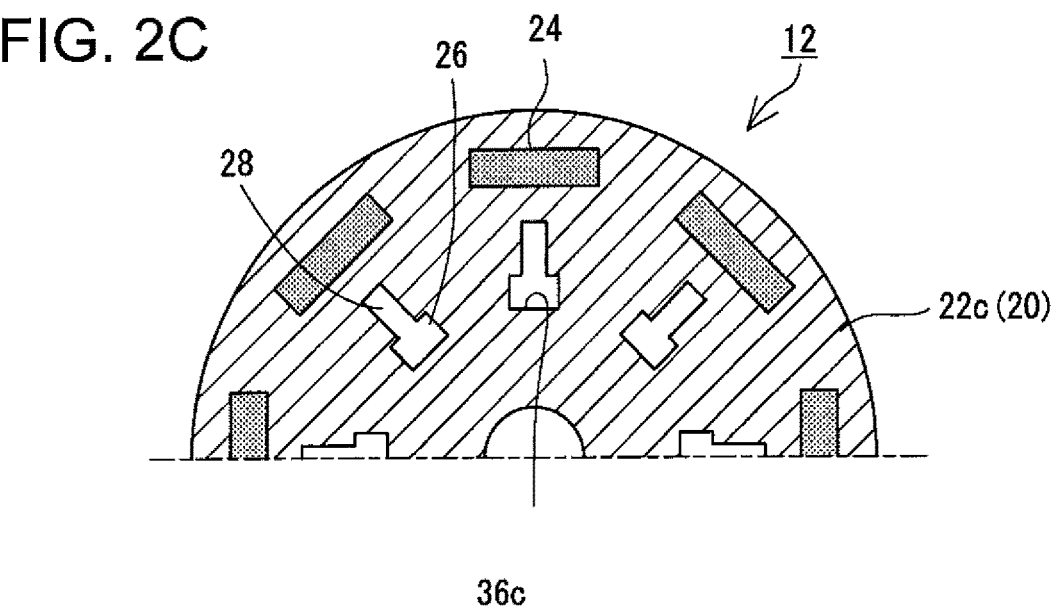
FIG. 2C is a cross-sectional view of the rotor taken along a line C-C of FIG. 1.

Hereinafter, a configuration of a rotary electric machine 10 will be described with reference to the drawings. FIG. 1 is a schematic longitudinal sectional view of the rotary electric machine 10. FIG. 2A is a cross-sectional view of a rotor 12 taken along the line A-A in FIG. 1. Likewise, FIG. 2B is a cross-sectional view of the rotor 12 taken along the line B-B in FIG. 1, and FIG. 2C is a cross-sectional view of the rotor 12 taken along the line C-C in FIG. 1. In the following description, an "axial direction", a "radial direction" and a "circumferential direction" mean an axial direction of the rotor, a radial direction of the rotor, and a circumferential direction of the rotor.

The rotary electric machine 10 is a synchronous rotary electric machine having a permanent magnet in which a permanent magnet 24 is embedded in a rotor core 20. The rotary electric machine 10 includes the rotor 12 and a stator 14. The stator 14 has a substantially annular stator core 18 having a plurality of teeth formed on an inner periphery thereof, and a stator coil 19 wound around each tooth. The rotor 12 is arranged inside the stator 14 concentrically with the stator 14. A gap having a substantially uniform distance exists between an outer circumferential surface of the rotor 12 and an inner circumferential surface of the stator 14.

The rotor 12 includes the rotor core 20, and the permanent magnet 24 embedded in the rotor core 20. A rotary shaft 16 is inserted through the center of the rotor core 20. The rotary shaft 16 is firmly fixed to the rotor core 20 and rotates together with the rotor 12. Further, the rotary shaft 16 is rotatably supported by a motor case (not illustrated) via a bearing (not illustrated) or the like.

The rotor core 20 is formed by laminating a plurality of electromagnetic steel plates 22 in the axial direction. In FIG. 1, although the thickness of each electromagnetic steel plate 22 is illustrated for the sake of easy viewing, in reality, each electromagnetic steel plate 22 is sufficiently thin, and one rotor core 20 is made up of a greater number of electromagnetic steel plates 22 than the case illustrated in FIG. 1. As illustrated in FIGS. 2A to 2C, each of the electromagnetic steel plates 22 has a disk shape, and for example, a silicon electromagnetic steel plate or the like is used. In the vicinity of the outer periphery of the rotor core 20, a plurality of magnet holes for embedding the permanent magnets 24 are formed. The plurality of magnet holes are evenly arranged in the circumferential direction of the rotor core 20, and each magnet hole penetrates through the rotor core 20 in the axial direction.

In each magnet hole, the permanent magnet 24 constituting the magnetic pole is embedded. The permanent magnet 24 has a substantially rectangular shape as viewed in the axial direction, and is magnetized in the radial direction of the rotor 12. The plurality of permanent magnets 24 are equally arranged in the circumferential direction so that the polarities of the magnetic poles are alternately arranged in the circumferential direction. The shape and the number of the permanent magnets 24 exemplified here are mere examples and may be changed as appropriate depending on the required characteristics of the rotary electric machine 10. Therefore, for example, the permanent magnet 24 may have a substantially circular arc shape. Further, one magnetic pole may be constituted by two or more permanent magnets 24. For example, one magnetic pole may be constituted by the two permanent magnets 24 disposed at a posture which spreads in a substantially V shape toward the outer circumference side of the rotor core 20. Further, in FIGS. 2A to 2C, an example in which eight magnetic poles are formed by eight permanent magnets 24 is illustrated, but the number of magnetic poles formed by the permanent magnets 24 is not particularly limited as long as it is an even number. Furthermore, the permanent magnet 24 may be provided on the outer circumferential surface of the rotor core 20, rather than inside the rotor core 20.

A flow passage through which the cooling liquid for cooling the rotor 12 and the stator 14 passes is formed in the rotary shaft 16 and the rotor core 20. The flow passage is roughly divided into an in-shaft flow passage 40 formed in the rotary shaft 16 and an in-core flow passage formed in the rotor core 20. The in-shaft flow passage 40 is a hole passing through the axial center of the rotary shaft 16. The in-shaft flow passage 40 extends from one end of the rotary shaft 16 to approximately the center of the rotary shaft 16, then branches in the radial direction, and extends to the inner circumferential end of the rotor core 20.

The in-core flow passage is roughly divided into a first flow passage 26 extending in the axial direction, a second flow passage 28 extending radially outward from the first flow passage 26, and a third flow passage 30 which connects the first flow passage 26 and the in-shaft flow passage 40. The first flow passage 26 is a flow passage which penetrates the rotor core 20 in the axial direction and communicates with the outside of the rotor 12. A plurality of first flow passages 26 are provided at intervals in the circumferential direction. Although the number and arrangement of the first flow passages 26 are not particularly limited, in the illustrated example, the first flow passages 26 are provided in the same number as the magnetic poles, that is, eight. Further, the position of the first flow passage 26 is not particularly limited. However, as will be described later, when sucking and holding the foreign matter contained in the cooling liquid by the magnetic force of the permanent magnet 24, it is desirable that the first flow passage 26 be located on a more inward side in the radial direction than the permanent magnet 24. In this case, it is also desirable that the circumferential position of the first flow passage 26 be within a circumferential range R (see FIG. 2A) of the permanent magnet 24. However, as illustrated by a two-dot chain line in FIG. 2A, the first flow passage to the third flow passage 26 to 30 may be provided between the magnetic pole and the magnetic pole. In addition, in order to maintain the rotational balance of the rotor 12, it is preferable that the first flow passage 26 be equally provided in the circumferential direction. Furthermore, as long as a longitudinal direction of the first flow passage 26 includes an axial component, the first flow passage 26 is not necessarily required to be completely parallel to the axial direction of the rotor 12, but may be inclined with respect to the axial direction of the rotor 12. However, as it will be described later, in order to reduce the type of the electromagnetic steel plate 22 for constituting the first flow passage 26, it is preferable that the first flow passage 26 extend in a direction parallel to the axial direction of the rotor 12.

As will be described later, the second flow passage 28 is a flow passage for catching and holding foreign matter mixed into the cooling liquid. The second flow passage 28 extends radially outward from the first flow passage 26, more preferably, in a direction approaching the permanent magnet 24. Further, a distal end (a radially outer end portion) of the second flow passage 28 is closed at the position on the radially more inward side than the permanent magnet 24. Therefore, in principle, the cooling liquid flowing into the second flow passage 28 and foreign matter mixed into the cooling liquid remain in the second flow passage 28 without escaping to the outside.

The number of second flow passages 28 connected to the single first flow passage 26 is not particularly limited, and may be one, or two or more. In the illustrated example, three second flow passages 28 are connected to the single first flow passage 26 at intervals in the axial direction. Here, it is preferable that at least one of the second flow passages 28 be provided at the same axial position as an inlet port 26i of the cooling liquid of the first flow passage 26. The inlet port 26i of the cooling liquid is an upstream end of the first flow passage 26. By providing the second flow passage 28 at the same axial position as the upstream end, the foreign matter contained in the cooling liquid can be caught at the upstream end, and the amount of foreign matter flowing downstream can be reduced.

The third flow passage 30 is a flow passage that connects the in-shaft flow passage 40 and the first flow passage 26, and is a flow passage that extends in the radial direction from the inner circumferential end of the rotor core 20 to the first flow passage 26. The third flow passage 30 is provided only at the approximate center in the axial direction of the rotor 12.

The first to third flow passages 26 to 30 are constituted by slits 36a to 36c formed in the three types of electromagnetic steel plates 22a to 22c. Specifically, the rotor core 20 includes a first steel plate 22a (see FIG. 2A) having slits 36a corresponding to the first to third flow passages 26 to 30 formed thereon, a second steel plate 22b (FIG. 2B) having a slit 36b corresponding to the first flow passage 26 formed thereon, and a third steel plate 22c (FIG. 2C) having slits 36c corresponding to the first flow passage 26 and the second flow passage 28 formed thereon. Here, when the longitudinal direction of the first flow passage 26 is a direction parallel to the axial direction, the hole position corresponding to the first flow passage 26 does not change in any of the steel plates 22. Therefore, with such a configuration, the number of types of the second steel plate 22b can be reduced.

In FIG. 1, only single first steel plate 22a is used, but actually, a plurality of first steel plates 22a are arranged in series in the axial direction. By changing the number of sheets of the first steel plates 22a continuously laminated, the axial dimensions of the second flow passage 28 and the third flow passage 30, and the cross-sectional areas of the second and third flow passages 28 and 30 change. Likewise, in FIG. 1, the second steel plates 22b are disposed on both sides of the single third steel plate 22c, but the plurality of third steel plates 22c may be continuously arranged in the axial direction. By changing the number of sheets of the third steel plates 22c continuously laminated, the axial dimension of the second flow passage 28 and the cross-sectional area of the second flow passage 28 change.

Next, a method for cooling the rotary electric machine 10 will be described. When the rotary electric machine 10 generates heat with the driving of the rotary electric machine 10 and cooling of the rotary electric machine 10 is necessary, the cooling liquid is supplied from one end of the rotary shaft 16 to the in-shaft flow passage 40. This cooling liquid is supplied from a cooling liquid supply source (not illustrated) provided outside the rotary electric machine 10 by a pump or the like. The cooling liquid supplied to the in-shaft flow passage 40 subsequently flows into the first flow passage 26 via the third flow passage 30. The cooling liquid that has flowed into the first flow passage 26 branches to both sides in the axial direction and passes through the first flow passage 26. In the course of the passage, the heat from the rotor core 20 is removed by the cooling liquid, thereby cooling the rotor core 20.

Finally, the cooling liquid that has passed through the first flow passage 26 is discharged to the outside from the axial end face of the rotor 12. At this time, since the cooling liquid is subjected to the centrifugal force generated with the rotation of the rotor 12, the cooling liquid is ejected to the outside in the radial direction and flows toward the stator 14, particularly, a coil end of the stator coil 19. When the cooling liquid contacts the stator 14, the stator 14 is also cooled. Thereafter, the cooling liquid drops to the bottom of the motor case by gravity. The dropped cooling liquid is appropriately recovered, cooled, and returned to the cooling liquid supply source.

Here, as is apparent from the above description, the cooling liquid used for cooling the rotary electric machine 10 circulates through a predetermined path and is repeatedly used. In this case, when the cooling liquid continues to be used for a long period of time, foreign matter abraded and released from a member in the middle of the circulation path may be mixed into the cooling liquid. In particular, when lubricating oil called automatic transmission fluid (ATF) is used as the cooling liquid, the cooling liquid is supplied not only to the rotary electric machine 10 but also to the mechanical components such as gears. In this case, metal powder generated by rubbing of the mechanical components with each other is liable to be mixed into the cooling liquid. For example, in the case of the rotary electric machine 10 mounted in a vehicle as one of the power sources of the vehicle, a gear group constituting the transmission is often provided in the vicinity of the rotary electric machine 10. In this case, a cooling liquid (ATF or the like) for cooling the rotary electric machine 10 is often also made to flow through the gear group, and in that case, metal powder generated at the time of engagement of the gears is likely to be mixed into the cooling liquid.

When the cooling liquid mixed with foreign matter, particularly, a hard metal powder, is continuously used, deterioration of the coating or the like of the rotary electric machine 10, particularly the stator coil 19, which comes into contact with the cooling liquid, may be caused. Further, when there is a lot of foreign matter mixed into the cooling liquid, there may also be cases where clogging of the flow of the cooling liquid passage occurs.

The second flow passage 28 is provided to remove foreign matter mixed into such cooling liquid, in particular, foreign matter (metallic powder) made up of a magnetic material from the cooling liquid. Further, in order to securely introduce such foreign matter to the second flow passage 28, liquid which has a smaller specific gravity (density) than a foreign matter expected to be mixed, in other words, foreign matter to be caught in the second flow passage 28, for example, ATF, is used as a cooling liquid. By adopting such a configuration, it is possible to reduce the foreign matter mixed into the cooling liquid.

Figure 3:
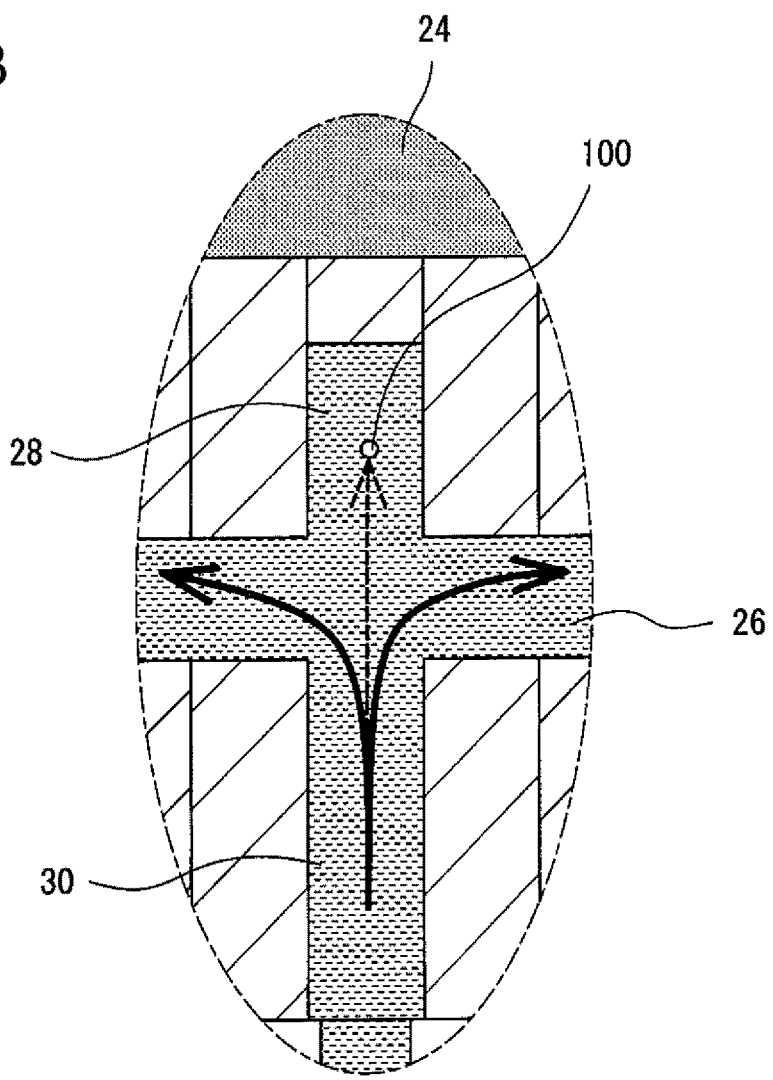
FIG. 3 is an enlarged view of a part D of FIG. 1.

This will be explained with reference to FIG. 3. FIG. 3 is a schematic enlarged view of a part D of FIG. 1. The cooling liquid supplied to the rotor 12 rotating at a high speed attempts to proceed radially outward due to the influence of the centrifugal force. Therefore, when the cooling liquid is supplied to the rotor 12, the second flow passage 28 is filled with the cooling liquid in a comparatively short time. However, since the distal end of the second flow passage 28 is blocked, once the second flow passage 28 is filled with the cooling liquid, almost no new cooling liquid flows into the second flow passage 28. As a result, most of the cooling liquid does not proceed into the second flow passage 28 but proceeds through the first flow passage 26 in the axial direction.

On the other hand, since foreign matter 100 mixed into the cooling liquid has a greater specific gravity than the cooling liquid, the foreign matter 100 receives a greater centrifugal force than the cooling liquid. As a result, the foreign matter 100 tries to proceed radially outward against the flow of the cooling liquid. Therefore, even in a state in which the second flow passage 28 is filled with the cooling liquid, the foreign matter 100 proceeds into the second flow passage 28. That is, due to the action of centrifugal separation, the foreign matter 100 having a greater specific gravity than the cooling liquid remains at the distal end of the second flow passage 28.

In addition, the second flow passage 28 extends in a direction approaching the permanent magnet 24. Therefore, in the foreign matter 100, foreign matter (hereinafter referred to as "magnetic foreign matter") made up of a magnetic material is also affected by the magnetic force of the permanent magnet 24 in addition to the action of centrifugal separation. As a result, magnetic foreign matter more reliably proceeds to the distal end of the second flow passage 28.

As described above, the foreign matter 100 mixed into the cooling liquid proceeds through the second flow passage 28 by the action of centrifugal separation and the action of the magnetic force of the permanent magnet 24, and remains at the distal end of the second flow passage 28. Accordingly, it is possible to reduce foreign matter contained in the cooling liquid that is recycled. As a result, it is possible to effectively prevent clogging of the flow of the cooling liquid passage due to foreign matter and damage to the object to be cooled.

Further, in the rotor 12, the permanent magnet 24 is most likely to generate heat, and tends to have a high temperature. Since the permanent magnet 24 may be irreversibly demagnetized when it is heated to an excessively high temperature, it is desired that the permanent magnet 24 be efficiently cooled. In the example, since the second flow passage 28 extending to the vicinity of the permanent magnet 24 is provided, the cooling liquid can be guided to the vicinity of the permanent magnet 24, and the permanent magnet 24 can be more effectively cooled.

Further, as described above, once the rotor 12 starts to rotate, the cooling liquid of the second flow passage 28 hardly changes afterwards. Therefore, it can be said that the cooling effect using the cooling liquid in the second flow passage 28 is somewhat low. However, as long as the cooling liquid in the second flow passage 28 does not become higher than the rotor core 20 and the permanent magnet 24, since the cooling liquid is located in the vicinity of the permanent magnet 24, there is a cooling effect of the permanent magnet 24. Further, when the temperature difference of the cooling liquid between the second flow passage 28 and the first flow passage 26 increases, in order to reduce the temperature difference, inflow and outflow of the cooling liquid occurs to some extent. As a result, the cooling liquid in the second flow passage 28 is prevented from becoming an excessive high temperature, and cooling of the permanent magnet 24 using the cooling liquid is promoted. That is, by providing the second flow passage 28, it is possible not only to reduce the foreign matter 100 mixed into the cooling liquid to be recycled but also to improve the cooling efficiency of the permanent magnet 24.

It is preferable that the distal end of the second flow passage 28 be set at a position where the permanent magnet 24 can magnetically attract the magnetic foreign matter arriving at the distal end of the second flow passage 28. With such a configuration, even after the rotor 12 decelerates or stops rotation (after the centrifugal force decreases or becomes zero), the magnetic foreign matter can be continuously held in the second flow passage 28.

At least one of the second flow passages 28 is preferably provided at the same axial position as the inlet port 26i of the cooling liquid of the first flow passage 26, that is, at the upstream end of the first flow passage 26. With such a configuration, since the foreign matter 100 can be caught and removed on the upstream side of the first flow passage 26, it is possible to effectively prevent damage or the like of the first flow passage 26 due to the foreign matter 100.

At least one of the second flow passages 28 is desirably provided near the center in the axial direction. This is because heat of the permanent magnet 24 tends to be caught near the center in the axial direction. By providing the second flow passage 28 extending to the vicinity of the permanent magnet 24 near the center in the axial direction, the permanent magnet 24 can be more effectively cooled.

Furthermore, it is preferable that a plurality of the second flow passages 28 be provided at intervals in the axial direction. With such a configuration, the foreign matter 100 that cannot be caught on the upstream side of the first flow passage 26 can also be caught on the downstream side, and it is possible to more reliably reduce the foreign matter 100 contained in the cooling liquid finally ejected from the rotor 12. Thus, it is possible to effectively prevent the damage to the coating film of the stator coil 19 caused by the foreign matter 100.

Figure 4:
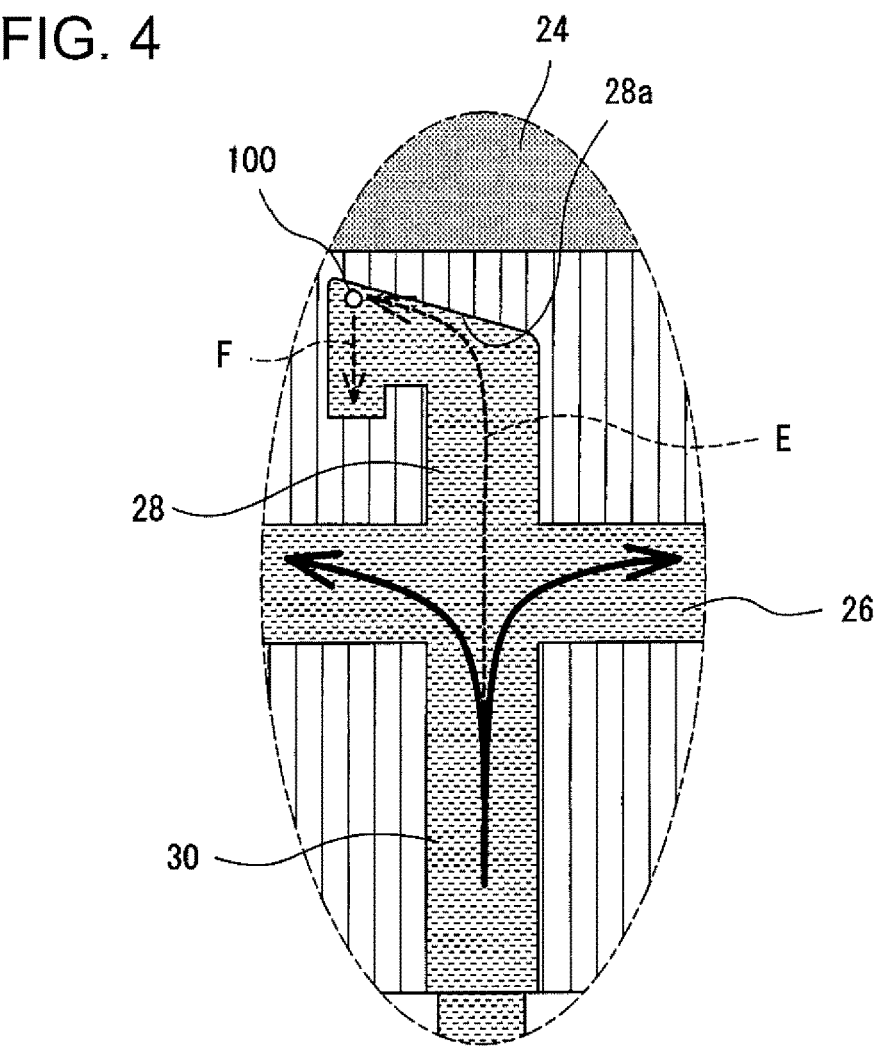
FIG. 4 is a view illustrating an example of another rotor.

The configuration described above is an example. As long as at least the first flow passage 26 extending in the axial direction in the rotor core 20, and the second flow passage 28 extending radially outward from the first flow passage 26 and having a closed distal end are provided, other configurations may be appropriately changed. For example, in the above description, the second flow passage 28 has a shape extending straight in the radial direction, but as illustrated in FIG. 4, the second flow passage 28 may have a substantially J-shape in which the distal end thereof proceeds radially outward, extends axially outward and then proceeds further radially inward. At this time, the radially outer end face is formed as an inclined surface 28a which proceeds axially outward as it extends outward in the radial direction. With this configuration, during rotation of the rotor 12, the foreign matter 100 proceeds to the axially outer end portion along the inclined surface 28a by centrifugal force as indicated by an arrow E in FIG. 4. Thereafter, it is assumed that the rotation of the rotor 12 is stopped and the centrifugal force is lost. At this time, the foreign matter 100 made up of a nonmagnetic material moves in accordance with gravity. When the distal end of the second flow passage 28 is formed in a J shape, even in a case where the foreign matter 100 moves in a direction away from the permanent magnet 24 (for example, in the direction of arrow F illustrated in FIG. 4) by gravity, the foreign matter does not return to the first flow passage 26 and remains in the second flow passage 28. In other words, when the distal end of the second flow passage 28 is formed in a substantially J shape, it is possible to prevent the foreign matter 100, which is caught in the second flow passage 28 and is made up of a nonmagnetic material, from returning to the cooling liquid to be recycled.

Figure 5:
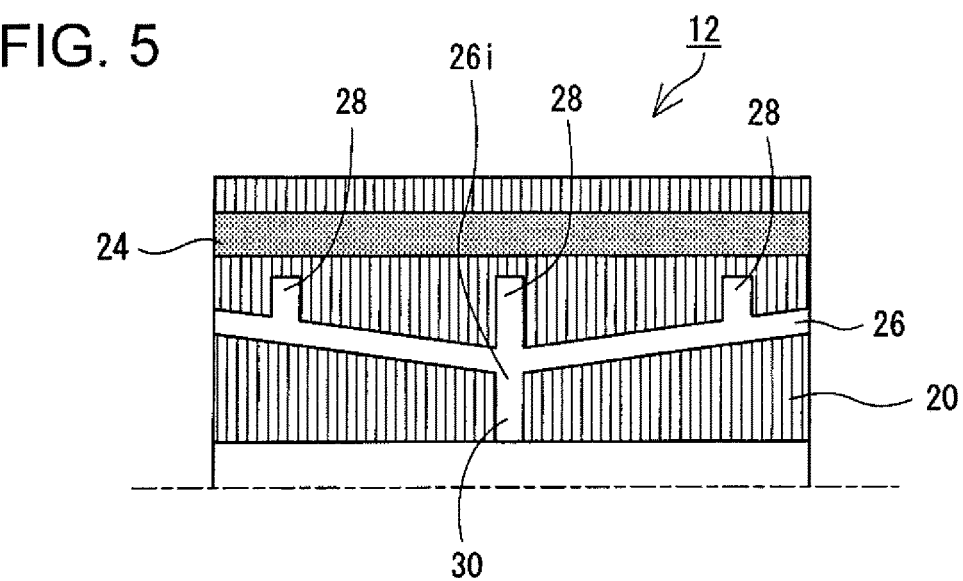
FIG. 5 is a view illustrating an example of another rotor.

Further, in the above description, the longitudinal direction of the first flow passage 26 is assumed to be parallel to the axial direction of the rotor 12, but the first flow passage 26 may be inclined with respect to the axial direction of the rotor 12. For example, as illustrated in FIG. 5, the first flow passage 26 may be inclined to go outward in the radial direction as it extends outward in the axial direction from the inlet port 26i of cooling liquid. With such a configuration, the flow velocity of the cooling liquid flowing through the first flow passage 26 can be further improved, and the cooling efficiency can be further improved. That is, as the distance from the rotation center increases, the centrifugal force increases. Therefore, when the first flow passage 26 is inclined as illustrated in FIG. 5, the centrifugal force acting on the first flow passage 26 is greater on the axially outer side (downstream side) of the first flow passage 26 than on the axial center (upstream side). In other words, in the first flow passage 26 of FIG. 5, a centrifugal force difference occurs along the axial direction. Due to the centrifugal force difference, the cooling liquid supplied to the center in the axial direction tends to proceed in a direction in which the centrifugal force is larger, that is, toward the outer side in the axial direction. As a result, the flow velocity of the cooling liquid flowing through the first flow passage 26 can be improved, and the cooling efficiency can be further improved.

Figure 6:
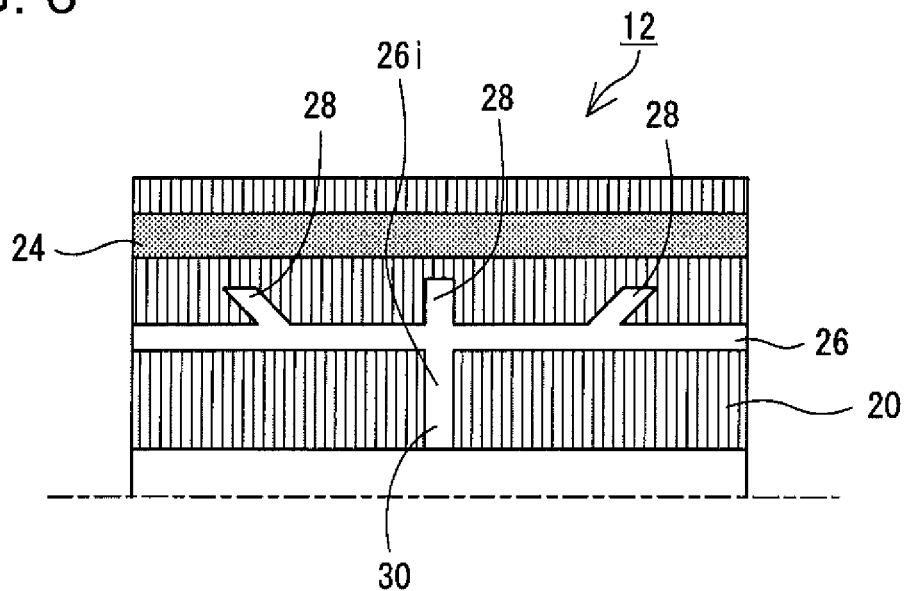
FIG. 6 is a view illustrating an example of another rotor.

Further, as illustrated in FIG. 6, at least one of the plurality of second flow passages 28 may be inclined to face outward in the axial direction (toward the downstream side of the flow of the cooling liquid) as it extends outward in the radial direction. With such a configuration, the foreign matter 100 that has flowed in the axial direction along the first flow passage 26 easily branches to the second flow passage 28. As a result, the foreign matter 100 mixed into the cooling liquid can be more reliably reduced.

Figure 7A:
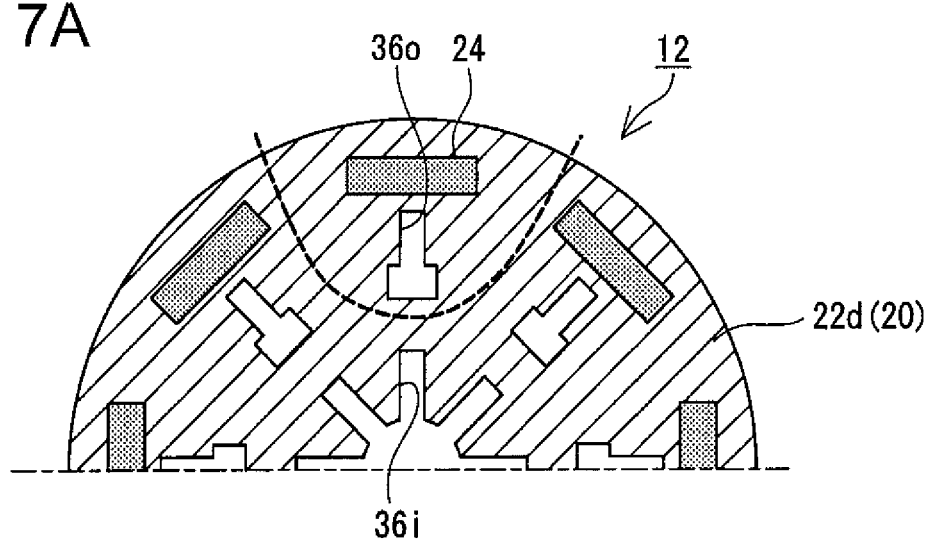
FIG. 7A is a view illustrating another example of an electromagnetic steel sheet.
Figure 7B:
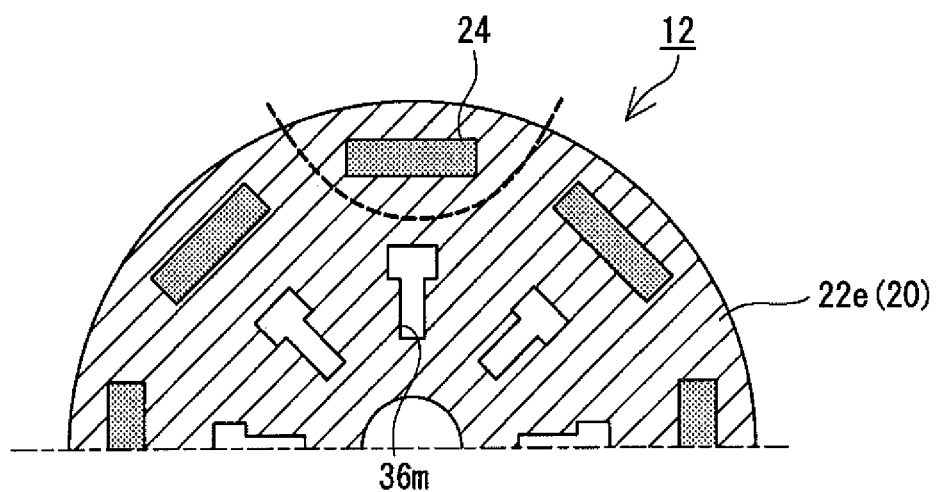
FIG. 7B is a view illustrating another example of the electromagnetic steel sheet.

Further, in the above description, the flow passage extending long in the radial direction is constituted by one type of electromagnetic steel plate 22. However, the flow passage extending in the radial direction may be constituted by a plurality of types of electromagnetic steel plates 22. For example, in the first steel plate 22a illustrated in FIG. 2A, slits 36a corresponding to the first to third flow passages 26 to 30 are formed. As is clear from FIG. 2A, the slits 36a extend in the radial direction. The slits 36a serve as a magnetic resistance that hinders the flow of the magnetic flux. In particular, the q-axis magnetic flux for generating the reluctance torque enters the rotor 12 from a part (salient pole) between the magnetic pole and the magnetic pole as illustrated by broken lines in FIGS. 7A and 7B, crosses the d-axis, and then exits from the adjacent salient poles. The slits 36a extending long in the radial direction hinder the flow of the q-axis magnetic flux, causing a decrease in the reluctance torque. Therefore, instead of the first steel plate 22a having the slits 36a extending long in the radial direction, the fourth steel plate 22d and the fifth steel plate 22e illustrated in FIGS. 7A and 7B may be used. On the fourth steel plate 22d, an inner slit 36i extending near the inner circumferential end and an outer slit 36o formed near the permanent magnet 24 are formed. The inner slit 36i and the outer slit 36o are not connected, and a steel sheet material functioning as a magnetic path exists between the inner slit 36i and the outer slit 36o. Therefore, in this case, the q-axis magnetic flux which generates the reluctance torque passes between the inner slit 36i and the outer slit 36o.

Further, an intermediate slit 36m for connecting the inner slit 36i and the outer slit 36o is formed in the fifth steel plate 22e. An inner circumferential end of the intermediate slit 36m is located on the radially inner side than the outer circumferential end of the inner slit 36i, and the outer circumferential end of the intermediate slit 36m is located on the radially outer side than the inner circumferential end of the outer slit 36o. Further, the width from the intermediate slit 36m to the permanent magnet 24 is set such that the magnetic flux sufficiently flows. Therefore, in this case, the q-axis magnetic flux which generates the reluctance torque passes between the intermediate slit 36m and the permanent magnet 24.

Further, when the fourth steel plate 22d and the fifth steel plate 22e are vertically laminated, the inner slit 36i and the intermediate slit 36m communicate with each other in the axial direction, and the intermediate slit 36m and the outer slit 36o communicate with each other in the axial direction. As a result, the flow passages corresponding to the first to third flow passages 26 to 30 are formed. On the other hand, as described above, in any of the steel plates 22d and 22e, since a magnetic path for allowing the q-axis magnetic flux to pass is sufficiently secured, a reduction in reluctance torque can be prevented.

In the above description, the cooling liquid is supplied from the axially central position to the first flow passage 26, but the supply position of cooling liquid is not particularly limited, and the cooling liquid may be supplied from the vicinity of one end in the axial direction of the first flow passage 26. Further, the first flow passage 26 may finally communicate with the outside of the rotor 12, and may not necessarily penetrate through the rotor core 20. Therefore, for example, the first flow passage 26 is closed at both ends in the axial direction, and a discharging flow passage extending from the first flow passage 26 to the outer circumferential end of the rotor core 20 may be provided in the vicinity of both ends in the axial direction to eject the cooling liquid from the outer circumferential surface of the rotor core 20. Furthermore, the number, the shape, and the position of the permanent magnets 24 or the flow passages described so far are all examples, and they may be changed as appropriate. Furthermore, in the above description, the inner rotor type rotary electric machine 10 in which the rotor 12 is disposed inside the stator 14 has been described as an example, but the technique disclosed in this specification may be applicable to an outer rotor type rotary electric machine 10.

The invention claimed is:

1. A rotor of a rotary electric machine comprising:
a rotor core; and
a plurality of permanent magnets disposed in an inner part or an outer circumferential surface of the rotor core in a circumferential direction,
wherein, in the rotor core:
one or more first flow passages through which a cooling liquid flows, the one or more first flow passages extending in an axial direction and communicating with the outside of the rotor are formed; and
one or more second flow passages extending radially outward from the one or more first flow passages and having closed distal ends are formed.

2. The rotor of the rotary electric machine according to claim 1, wherein the one or more first flow passages are formed on a radially more inward side than the plurality of permanent magnets, and
the distal ends of the one or more second flow passages are located at a position where the plurality of permanent magnets are able to magnetically attract foreign matter including a magnetic material reaching the distal ends of the one or more second flow passages.

3. The rotor of the rotary electric machine according to claim 1, wherein the one or more first flow passages have an inlet port for the cooling liquid, and
at least one of the one or more second flow passages extends from the same axial position as the inlet port of the one or more first flow passages.

4. The rotor of the rotary electric machine according to claim 1, wherein the rotor core is a laminate in which a plurality of steel plates are laminated in the axial direction, and
a longitudinal direction of the one or more first flow passages is parallel to the axial direction.

5. The rotor of the rotary electric machine according to claim 1, wherein a plurality of second flow passages are connected to each of the one or more first flow passages at intervals in the axial direction.

6. A method for cooling a rotary electric machine including a rotor, a stator arranged concentrically with the rotor, and a rotary shaft fixed to a center of the rotor and rotating together with the rotor,
wherein the rotor has a rotor core, and a plurality of permanent magnets arranged in an inner part or an outer circumferential surface of the rotor core in a circumferential direction,
in the rotor core:
one or more first flow passages through which a cooling liquid flows, the one or more first flow passages extending in an axial direction and communicating with the outside of the rotor are formed; and
one or more second flow passages extending radially outward from the one or more first flow passages and having closed distal ends are formed, and
the rotary electric machine is cooled by supplying the cooling liquid, which has a specific gravity smaller than foreign matter expected to be mixed into the cooling liquid, to the one or more first flow passages.

* * * * *